Patented Aug. 14, 1945

2,382,193

UNITED STATES PATENT OFFICE 2,382,193

STABILIZATION OF IODINE IN ANIMAL AND POULTRY FEEDS

Clarence Walter Whitmoyer and William James Moore, Myerstown, Pa., assignors to Whitmoyer Laboratories, Inc., Myerstown, Pa., a corporation of Delaware No Drawing. Application September 29, 1943, Serial No. 504,300

12 Claims. (Cl. 99—2)

This invention relates to animal and poultry feeds and feed supplements and more particularly to a method by which the iodine content may be stabilized in mixtures used for feeding stock and poultry.

It is well known that iodine is a necessary element in the nutrition of livestock and poultry and it has been the practice for sometime to supplement stock and poultry rations with iodine. In some instances the iodine has been added as the element itself or it has been added in the form of an iodide such as an alkali metal iodide. Moreover, it has been found desirable to produce certain feed supplements which are made to contain, besides iodine or salts of iodine, various other minerals or salts of minerals, such as iron oxide, ferrous sulphate, manganese sulphate, copper sulphate, salts of cobalt and other minerals. These mixtures frequently are balanced and sold to the feed manufacturer, stock raiser or poultry raiser in the form of supplements or concentrates. The concentrates are then mixed with the feeding mashes or grains to supply to the stock or poultry proper and ample quantities of iodine and other minerals which have been added including so-called trace minerals. Practical considerations in supplying such feeds or supplements require that the feed mixtures or supplements be held or stored for varying periods of time and under varying conditions.

One of the perplexing problems in producing and supplying feed mixtures to which has been added iodine, whether in the form of the element itself or as an iodine compound, has been the stabilization of the iodine content of the feed mixture. In some instances the iodine has been added to feed mixtures as iodized salt or potassium iodide. Various methods have been suggested for stabilizing the iodine content of iodized salt and the like such as the addition of reducing agents like sodium thiosulphate or the coating of potassium iodide granules with calcium stearate. Some of these suggestions are helpful under certain conditions but under conditions where circumstances for oxidation are favorable these suggested methods fail partly or entirely. Moreover, the problem of effective stabilization is aggravated when the mixture containing the inorganic iodide also contains other inorganic salts such as salts of iron, copper and manganese, either as additions or as impurities. On prolonged standing potassium iodide in the presence of the aforementioned salts, either through chemical reaction or catalytic effect, breaks down to liberate iodine which volatilizes and escapes. Consequently, even if the suggested precautions are taken the iodine content of the feed supplements or concentrates does not remain stabilized. The loss of iodine is particularly noticeable if they are stored or kept for extended periods of time.

According to our invention there is provided a process for stabilizing the iodine content of stock and poultry feed mixtures, supplements of concentrates which has proved efficacious under conditions where prior known methods have failed. Not only does our method stabilize the iodine content when the iodine is added to the feed mixtures in the form of an iodide such as alkali metal iodide regardless of the presence of other minerals or salts which normally have the effect of liberating the iodine when present as impurities or as additions, but in addition to stabilizing the iodine content of the mixture our method has the further advantage of forming with such iodine as is liberated in the mixture a highly assimilable protein-iodine compound.

We not only provide a novel method of stabilizing the iodine content in feed mixtures but the resultant product is a highly desirable and novel one in that iodine is present in a form better adapted for assimilation when fed to livestock or poultry than is a product wherein the iodine is present only in the form of inorganic salts of iodine.

Ordinarily, by reason of economic considerations, the source of iodine for addition to animal feed mixtures is potassium iodide on account of its relative lower cost. Our invention lends itself admirably to the use of this source material as our method is not only adapted to stabilizing the iodine content of a mixture containing potassium iodide wherein inorganic salts of other metals are absent but is is effective in the presence of such salts whether existing as impurities or voluntarily added to produce a balanced ration or concentrate. Consequently, in accordance with our invention there may be produced a feed mixture, supplement or concentrate which, in addition to having its iodine content stabilized, may contain desirable and predetermined quantities of other important or essential minerals or salts of minerals. Moreover, a substantial part, if not all of the iodine in the mixture will exist in the form of a highly assimilable thyroprotein.

To accomplish the foregoing objects and desirable ends comprehended by our invention as well as others which will appear from the description hereinafter, we select a protein or protein containing substance which has an affinity for and will react with iodine to form an iodine protein compound such as a thyroprotein and intimately intermix the protein substance with a source material containing iodine which will release the iodine and react to form a stable organic thyroprotein compound. Preferably, we add to the mixture salts of minerals to provide in the mixture other elements essential or desirable in the diet of the animals for which the mixture is intended. Consequently, we take advantage of the circumstance that in the presence of certain inorganic salts, iodine in the form of iodide breaks down and free iodine is liberated. By reason of the presence of added reactive protein, according to our invention, the iodine is not permitted to escape but instead is absorbed by the protein to form stable iodine-protein compound in the form of a thyroprotein. Regardless of long standing of the mixture the iodine content remains stabilized for the reason that if all iodine of the iodine source material is not immediately released, it nevertheless does not escape if it is subsequently liberated because the reaction with the protein material which we add continues to form thydroprotein in the event the liberation of iodine from the iodide continues.

Although the novel features which are believed to be characteristic of the invention will be pointed out in the claims appended hereto, the invention itself as to its objects and advantages and the manner in which it may be carried out may be better understood by reference to the following description wherein is set forth various examples for the purposes of illustration.

According to one manner of producing the product of our invention 83.7 parts of dried animal liver powder were intimately ground together with 25.4 parts of a mixture of 90% potassium iodide and 10% calcium carbonate. To the resulting product was added and intimately intermixed therewith 660 parts of ferrous sulphate, 69 parts of manganese sulphate and 1.1 parts of copper sulphate.

As another example, we intimately intermixed 660 grams of ferrous sulphate, 25.4 grams of potassium iodide, calcium carbonate mixture (containing 90% potassium iodide and 10% calcium carbonate), 83.7 grams of dried skim milk, 69.0 grams of manganese sulphate and 1.1 grams of copper sulphate, to form a feed mixture concentrate.

These are mixtures which may be used in animal and poultry feeds to supply iodine and other trace minerals. The concentrate mixture may be added in the proportion of about two pounds per ton to an all-mash poultry feed and in such proportion supplies ample quantities of iodine and other trace minerals. Cobalt salts may be added, if desired.

In the preparation of laboratory batches this can be done satisfactorily with a mortar and pestle. In commercial production a trowel type of batch mixer, a Simpson mixer or other suitable equipment insuring intimate intermixing may be used, it being particularly important to insure intimate contact of the iodine carrying salt with the protein carrying substance, whereby any iodine liberated from its salt is taken up or absorbed by the protein to form thyroprotein.

Mixtures made according to our invention not only showed no signs of losing any of their iodine content after many months standing but of no lesser significance is the fact that the iodine is present in the mixtures in a form more highly assimilable than when iodine is supplied in the diet in the form of iodized salt or as potassium iodide. By a series of check experiments we showed that it required only about 5% of the iodine in the product of our invention as when the iodine is supplied in the medium of iodized salt or as potassium iodide in a mixture or minerals commonly used in poultry feeds to produce a given iodine level in the blood.

As another specific example of the product of our invention, 22.8 grams of potassium iodide in the form of a 25.4 gram mixture comprising 90% potassium iodide and 10% calcium carbonate may be ground in a mortar and pestle with 84 grams of dried brewer's yeast. To this may be added and ground therewith about 660 grams of iron oxide in powder form, 69 grams of manganese sulphate, 1.1 grams of copper sulphate. This mixture containing as indicated several mineral salts known to be conducive to the liberation of iodine from potassium iodide on long standing will nevetrthless have its iodine content stabilized. And even though some of the potassium iodide may break down slowly over a period of time to liberate iodine nevertheless the iodine will not be lost by vaporization but will continue to react with the protein in the mixture to form an iodine protein compound which does not permit the iodine to be lost.

In addition to the protein containing substances mentioned above, other materials containing proteins having an affinity for iodine may be used to stabilize the iodine content of feed mixtures according to our invention. We have used, with satisfactory results, dried fish meal, dried buttermilk and dried fish liver meal in place of those mentioned in the foregoing. Mixtures of approximately 10% of protein materials selected from those mentioned have proved satisfactory with a combination of minerals as set forth above, although it will be understood that certain benefits of the invention will be possible by using smaller percentages of the proteins. Of course, larger percentages of proteins can be employed as this would make available more products capable of reacting with any liberated iodine to prevent its loss by vaporization. In some instances 6% protein material based on the total amount of all the ingredients in the feed mixture supplement proved to be satisfactory.

Moreover, we have successfully stabilized the iodine content of feed mixtures by intermixing potassium iodide and other mineral salts with comminuted or ground raw fish or offal (after the oil was largely extracted). After intimate intermixing the product was then dried to a moisture content of approximately 10% in a rotary vacuum drier. The iodine content of the dried mixture was satisfactorily stabilized. As representative of other minerals which may be added to feed mixtures of the type comprehended by the invention the following may be mentioned: salts of copper, iron, calcium, manganese, cobalt, potassium and sodium. Furthermore, the invention contemplates the stabilization of iodine in feed mixtures by intermixing the protein carrying material in wet or partially wet condition with the iodine containing source material in which additional minerals may be present or absent as desired. After intermixing in wet conditions, the mixture may then be dried to form a product having its iodine content stabilized.

It will be seen from the foregoing that our invention provides a process for stabilizing the iodine content of feed mixtures which lends itself admirably to commercial production. Moreover, the product produced by the reaction of the protein and iodine is particularly desirable in that it contains the iodine in a highly assimilable form and thus requires less to be fed than products containing the iodine solely in the form of an inorganic iodide. Furthermore, the mixture may contain other minerals and salts of minerals desirable in poultry and animal feeds even though such minerals and salts of minerals otherwise are conducive to the loss of iodine content.

While certain novel features of the invention have been disclosed herein, and are pointed out in the annexed claims, it will be understood that various omissions, substitutions, and changes may be made by those skilled in the art without departing from the spirit of the invention.

What is claimed is:

1. A method of stabilizing the iodine content of animal and poultry feed to which iodine source material has been added which comprises intermixing with said source material a protein containing substance having an affinity for iodine, whereby iodine liberated from the source material is absorbed by said protein.

2. A method of stabilizing the iodine content of animal and poultry feed to which iodine source material has been added which comprises intermixing with said source material in the presence of salts or metals a protein containing substance having an affinity for iodine whereby iodine liberated from the source material is taken up by said protein to form a thyroprotein.

3. A method of producing a comestible suitable for feeding to livestock or poultry which comprises intermixing an alkali metal iodide in the presence of salts of other metals with one or more protein containing materials selected from the group consisting of dried liver powder, dried fish meal, dried skim milk, dried yeast, dried buttermilk and dried liver meal.

4. A method of producing an animal and poultry feed supplement which comprises intermixing predetermined quantities of an alkali metal iodide with predetermined quantities of a comestible protein having an affinity for iodine, and adding to the reaction products thereof other inorganic mineral salts, said protein being added in sufficient amount to absorb iodine liberated from said iodide by reason of the presence of said other salts.

5. A method of producing an animal and poultry feed supplement which comprises intermixing a predetermined quantity of potassium iodide with predetermined quantities of one or more protein containing materials selected from the group consisting of dried liver powder, dried fish meal, dried skim milk, dried yeast, dried buttermilk and dried liver meal, adding one or more minerals in the form of salts of minerals selected from the group consisting of iron, copper, manganese and calcium, said protein acting to stabilize the iodine content of the mixture.

6. A method of making an animal or poultry feed supplement containing iodine and protein which comprises intermixing in wet condition an iodine source material and a protein containing material having an affinity for iodine and thereafted drying the mixture to form a product in which the iodine content is stabilized.

7. A method of making an animal or poultry feed supplement containing iodine and protein which comprises intermixing in wet condition an iodine source material and a protein containing material in the presence of one or more of the salts of iron, potassium, manganese and copper, and thereafter removing moisture from the mixture.

8. A mixture for feeding iodine and other minerals to stock and poultry which comprises a mixture of materials containing the minerals to be fed, an added alkali metal iodide and a protein containing material having an affinity for iodine, said mixture containing the reaction product of said protein and iodide in the form of a thyroprotein.

9. A mixture suitable for feeding to animals or poultry which comprises a mixture of one or more salts of minerals selected from the group consisting of sodium, potassium, calcium, iron manganese, cobalt and copper combined with the reaction product of an alkali metal iodide and a protein having an affinity for iodine.

10. A feed supplement suitable for feeding to livestock which comprises one or more salts of minerals from the group consisting of iron, calcium, manganese and copper, a thyroprotein reaction product of an alkali metal iodide and one or more protein containing materials selected from the group consisting of dried liver powder, dried fish meal, dried skim milk, dried yeast, dried buttermilk and dried liver meal.

11. A feed supplement which comprises an intimate mixing of a protein containing material having an affinity for iodine, potassium iodide, and one or more mineral compounds selected from the group consisting of iron, copper, calcium, manganese and cobalt, said protein being present in sufficient quantity to absorb iodine liberated from said iodide in the mixture.

12. A feed mixture for animals or poultry which comprises the following mentioned ingredients in approximately the proportions set forth: 660 parts on an iron compound selected from the group consisting of iron oxide and iron sulphate, 25.4 parts of a mixture containing 90% potassium iodide and 10% calcium carbonate, 69 parts manganese sulphate, 1.1 parts copper sulphate and 83.7 parts of protein-containing material selected from the group consisting of dried liver powder, dried fish meal, dried skim milk, dried yeast, dried buttermilk and dried liver meal.

CLARENCE WALTER WHITMOYER.
WILLIAM JAMES MOORE.

CERTIFICATE OF CORRECTION.

Patent No. 2,382,193. August 14, 1945.

CLARENCE WALTER WHITMOYER, ET AL.

It is hereby certified that error appears in the printed specification of the above numbered patent requiring correction as follows: Page 1, first column, line 50, for the words "salts or" read --salts of--; and second column, line 8, for "supplements of" read --supplements or--; line 38, for "is" after "but" read --it--; page 2, first column, line 23, for "thydro-" read -- thyro- --; and second column, line 5, for "or" after "mixture" read --of--; line 20, for "nevetrthless" read --nevertheless--; line 68, for "conditions" read --condition--; page 3, first column, line 28, claim 2, for "salts or" read --salts of--; and second column, line 41, claim 11, for "mixing" read --mixture--; line 51, claim 12, for "on an" read --of an--; and that the said Letters Patent should be read with this correction therein that the same may conform to the record of the case in the Patent Office.

Signed and sealed this 27th day of November, A. D. 1945.

Leslie Frazer
First Assistant Commissioner of Patents.

(Seal)